United States Patent
Vierkotten et al.

(10) Patent No.: US 10,808,654 B2
(45) Date of Patent: Oct. 20, 2020

(54) INTAKE SYSTEM FOR AN INTERNAL COMBUSTION ENGINE

(71) Applicants: PIERBURG GMBH, Neuss (DE); FORD-WERKE GMBH, Cologne (DE)

(72) Inventors: Dirk Vierkotten, Much (DE); Maximilian Flender, Duesseldorf (DE); Christian Vigild, Aldenhoven (DE); Andreas Kuske, Cm Geulle (NL)

(73) Assignees: PIERBURG GMBH, Neuss (DE); FORD-WERKE GMBH, Cologne (DE)

( * ) Notice: Subject to any disclaimer, the term of this patent is extended or adjusted under 35 U.S.C. 154(b) by 196 days.

(21) Appl. No.: 15/774,592

(22) PCT Filed: Oct. 20, 2016

(86) PCT No.: PCT/EP2016/075162
§ 371 (c)(1),
(2) Date: May 9, 2018

(87) PCT Pub. No.: WO2017/080773
PCT Pub. Date: May 18, 2017

(65) Prior Publication Data
US 2018/0347519 A1    Dec. 6, 2018

(30) Foreign Application Priority Data
Nov. 11, 2015 (DE) .................. 10 2015 119 432

(51) Int. Cl.
*F02M 35/10* (2006.01)
*F02M 25/06* (2016.01)
(Continued)

(52) U.S. Cl.
CPC .... *F02M 35/10222* (2013.01); *F01M 13/022* (2013.01); *F02M 25/06* (2013.01);
(Continued)

(58) Field of Classification Search
CPC ....... F02M 35/10222; F02M 35/10262; F02M 35/10157; F02M 26/70; F02M 26/21;
(Continued)

(56) References Cited

U.S. PATENT DOCUMENTS 4,823,759 A * 4/1989 Mitani ................. F02M 25/06
                                                 123/568.17
5,740,785 A * 4/1998 Dickey ..................... F02D 9/04
                                                 123/568.12
(Continued)

FOREIGN PATENT DOCUMENTS

| | | |
|---|---|---|
| CN | 102900575 A | 1/2013 |
| DE | 100 54 264 A1 | 5/2002 |

(Continued)

*Primary Examiner* — Hung Q Nguyen
*Assistant Examiner* — Susan E Scharpf
(74) *Attorney, Agent, or Firm* — Norman B. Thot (57) ABSTRACT

An intake system for an internal combustion engine includes a suction duct with a lateral bulge, an exhaust gas recirculation duct with a port into the suction duct, and a crankcase breather duct which extends into the lateral bulge in the suction duct.

14 Claims, 4 Drawing Sheets

(51) Int. Cl.
*F02M 26/21* (2016.01)
*F02M 26/70* (2016.01)
*F01M 13/02* (2006.01)

(52) U.S. Cl.
CPC ............ *F02M 26/21* (2016.02); *F02M 26/70* (2016.02); *F02M 35/10144* (2013.01); *F02M 35/10157* (2013.01); *F02M 35/10262* (2013.01); *F02M 35/10268* (2013.01); *Y02T 10/12* (2013.01)

(58) Field of Classification Search
CPC ............ F02M 35/10144; F02M 25/06; F02M 35/10268; Y02T 10/121; Y02T 10/146; F01M 13/022
See application file for complete search history.

(56) References Cited

U.S. PATENT DOCUMENTS

| | | | | |
|---|---|---|---|---|
| 6,390,080 | B1* | 5/2002 | Dowding | F01M 13/022 123/572 |
| 7,198,040 | B2* | 4/2007 | Noda | F02M 25/06 123/568.15 |
| 2004/0144373 | A1 | 7/2004 | Spix | |
| 2006/0060163 | A1* | 3/2006 | Vanderveen | F02M 35/0203 123/184.42 |
| 2007/0266705 | A1* | 11/2007 | Wood | F02B 37/22 60/599 |
| 2009/0126670 | A1* | 5/2009 | Kado | F02M 25/06 123/184.21 |
| 2009/0241886 | A1* | 10/2009 | Kameda | F02M 35/10144 123/184.21 |
| 2010/0150698 | A1* | 6/2010 | Wood | F02B 37/22 415/58.2 |
| 2012/0199104 | A1 | 8/2012 | Vogl | |
| 2012/0247439 | A1* | 10/2012 | Rannappan | F02D 41/1454 123/568.11 |
| 2013/0025576 | A1* | 1/2013 | Busato | F02M 26/16 123/568.11 |
| 2014/0326226 | A1* | 11/2014 | Senda | F01M 13/0011 123/573 |
| 2014/0352643 | A1* | 12/2014 | Clarke | F02M 35/10354 123/184.21 |
| 2015/0027420 | A1* | 1/2015 | Antoni | F02M 26/21 123/568.21 |
| 2016/0123283 | A1* | 5/2016 | Newman | F02M 35/10222 123/572 |

FOREIGN PATENT DOCUMENTS

| | | |
|---|---|---|
| DE | 10 2008 043 821 A1 | 6/2009 |
| DE | 10 2010 050 256 A1 | 5/2012 |
| DE | 10 2012 101 851 A1 | 9/2013 |
| DE | 10 2014 200 699 A1 | 7/2015 |
| DE | 10 2014 114 968 A1 | 4/2016 |
| FR | 2 908 473 A1 | 5/2008 |
| JP | 2002-371920 A | 12/2002 |

* cited by examiner

INTAKE SYSTEM FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2016/075162, filed on Oct. 20, 2016 and which claims benefit to German Patent Application No. 10 2015 119 432.5, filed on Nov. 11, 2015. The International Application was published in German on May 18, 2017 as WO 2017/080773 A1 under PCT Article 21(2).

FIELD

The present invention relates to an intake system for an internal combustion engine comprising a suction duct, a port of an exhaust gas recirculation duct into the suction duct, and a crankcase breather duct that extends into the suction duct.

BACKGROUND

Such intake systems are used in internal combustion engines to control the gas flow to be introduced into a cylinder of an internal combustion engine with respect to its composition of recirculated exhaust gas quantities and air quantities freshly taken in, and to simultaneously burn the crankcase breather gases which contain condensate and oil mist. Depending on the operating state of the internal combustion engine, different mixing ratios must be set in order to obtain minimum exhaust gas values and maximum performance values.

For a control, it is possible to either use two separate valves, which would also allow a control of the total amount via the two valves, or for these control valves to comprise two valve bodies actuated via a common actuator device so that only the mixture is changed. This design is in particular used in supercharged engines where the total intake amount can be controlled via the compressor capacity. To be able to realize such a control device with even smaller dimensions, it is also known to use only one control body instead of two control bodies, the control body cooperating with both ducts. The exhaust gas recirculation duct typically opens into the air suction duct immediately downstream of the flap serving as the throttle valve with these designs. When it is desired to increase the exhaust gas recirculation rate, the throttle flap is closed to the same extent as the exhaust gas recirculation valve is opened, which, besides resulting in an increase in the free cross section of the exhaust gas recirculation duct, also results in an increase in the pressure gradient in the exhaust gas recirculation duct, whereby the proportion of exhaust gas is further increased relative to the amount of air taken in.

Such an arrangement is described, for example, in DE 10 2010 050 256 A1, in which a flap is arranged in a branch between a fresh air supply duct and an exhaust gas recirculation duct. By turning the flap, the fresh air duct is opened to the same extent that the exhaust gas recirculation duct is closed, and vice versa. DE 10 2010 050 256 A1 also describes that the housing forming the fresh air supply duct and the port of the exhaust gas recirculation duct may comprise another port via which the crankcase breather gases can be supplied to the gas flow. How the crankcase breather gases are introduced is not, however, described.

A suction duct with a throttle flap is also described in DE 10 2008 043 821 A1 where a crankcase breather port is formed at the suction duct upstream of the throttle flap. This port extends approximately tangentially with respect to the suction duct at such a position that condensate which forms from the crankcase breather gas drops on an end of the throttle flap remote from the shaft. The breather port is correspondingly arranged geodetically above the throttle flap. This is supposed to prevent the intrusion of the condensate into the bearings of the throttle flap.

An intake system is described in DE 10 2014 200 699 A1 where a low pressure exhaust gas recirculation valve is movable with a throttle flap via a common drive shaft. In order to prevent condensate from the exhaust gas from reaching a downstream compressor and there causing damage, a connecting surface between the outlet of the suction duct and the inlet of the exhaust gas recirculation duct is formed so that the condensate flows towards the inlet of the exhaust gas recirculation duct, where it is again evaporated by the hot exhaust gas. The exhaust gas inlet is correspondingly arranged at the geodetically lowest point.

It is noted in this context that the terms geodetically above or geodetically below always refer to a position of a vehicle comprising the internal combustion engine that is normal with respect to earth's center, where a normal position means a plane road with a constant distance to the earth's center, i.e., not including uphill or downhill travel.

No solutions have to date been provided, however, which provide for the supply of crankcase breather gases in coupled throttle and low pressure exhaust gas recirculation devices. A problem of the known ways of introducing crankcase breather gases is that condensates are formed which may cause damage to a turbocharger, in particular when introduced upstream of the compressor of a turbocharger. There is also a risk of the shaft and the flaps becoming soiled, whereby the functionality thereof is limited.

SUMMARY

An aspect of the present invention is to provide an intake system in which the forming of condensate is reduced as far as possible or in which, by the arrangement of a blow-by port, existing condensate is kept away from the gas flow, if possible, and a discharge of existing condensate is provided so that the service life of a downstream compressor is extended. An aspect of the present invention is also to prevent the additional generation of noise as well as a soiling of the control flaps and drive shafts so that their functionality is also secured over a long service life.

In an embodiment, the present invention provides an intake system for an internal combustion engine which includes a suction duct comprising a lateral bulge, an exhaust gas recirculation duct comprising a port into the suction duct, and a crankcase breather duct configured to extend into the lateral bulge in the suction duct.

BRIEF DESCRIPTION OF THE DRAWINGS

The present invention is described in greater detail below on the basis of embodiments and of the drawings in which.

DETAILED DESCRIPTION

Because the crankcase breather duct extends into a lateral bulge of the suction duct, the warm crankcase breather gases are not introduced directly into the air flow. No swirling and no resulting sudden cooling therefore occur; the forming of condensate is therefore significantly reduced. The direct entrainment of condensate present in the crankcase breather gas by the air flow is also avoided. Noise generated is also damped since the point of inlet is not directly flowed at by the gas flow, but is arranged in the lee of the flow. Due to the pocket, the flap is also not directly subjected to oil mists.

In an embodiment of the present invention, the port of the exhaust gas recirculation duct and the port of the crankcase breather duct can, for example, have a common cross section perpendicular to the center axis of the suction duct. This means that the inlet of the breather gases occurs in approximately the same flow section of the suction duct as the inlet of the exhaust gas. This has the advantage that, when the exhaust gas is introduced, the gas flow in the suction duct is warmer, whereby the forming of condensate is also reduced. Condensate that still forms can also be discharged towards the warm exhaust gas duct so that it is not entrained towards the compressor by the air flow.

It is therefore advantageous that the port of the crankcase breather duct be arranged geodetically above the port of the exhaust gas recirculation duct. The condensate can correspondingly be transported towards the exhaust gas recirculation duct by the effect of gravity, where it can either evaporate or flow off into the duct.

In an embodiment of the present invention, the suction duct can, for example, have a trough-shaped recess at the geodetically lower end of which the port of the exhaust gas recirculation duct is arranged. The condensate from both the crankcase and the exhaust gas, which settles, for example, on the surrounding walls of the ducts or is formed in the lateral bulge, flows downward due to gravity and is collected in the trough. Since the port into the exhaust gas recirculation duct is at the lowest point of the trough, the condensate flows into the exhaust gas recirculation duct and is evaporated there by the hot exhaust gas.

It can be advantageous if the lateral bulge transitions into the trough-shaped recess so that the condensate flows from the bulge directly into the trough without being directly flowed at before by the air flow.

In an embodiment of the present invention, the port of the crankcase breather duct can, for example, be formed as an intake fitting that extends into the lateral bulge. The intake fitting can in particular be of tubular design, whereby "tubular" is not to be understood as limiting the cross sectional shape which may both be round and oval or rectangular. This significantly facilitates the manufacture and assembly and allows for a possibly necessary replacement.

In an embodiment of the present invention, the end of the intake fitting can, for example, be beveled so that the end has a longer and an opposite shorter side wall, wherein the longer side wall is arranged downstream with respect to the suction duct. The crankcase breather gas with the water dissolved therein is thereby additionally prevented from being entrained. The longer side wall is instead drawn so far down that it ends, if possible, only below the flow cross section of the air conducting duct. An outlet of such a design also offers the advantage of an enlarged outlet area, whereby the sensitivity to sooting is reduced.

In an embodiment of the present invention, a heating element, in particular a PTC heating element, can, for example, be arranged at the crankcase breather duct. The condensate- and oil mist-containing gas flow from the crankcase is heated by the heating element so that water already condensed is evaporated. Significantly less water thereby gets into the suction duct in the liquid state, so that the compressor is less loaded.

In an embodiment of the present invention, a shaft serving as a rotary axis can, for example, be arranged upstream of the port of the exhaust gas recirculation duct, as seen in the flow direction of the suction duct, wherein a control body is supported eccentrically on the shaft, and the shaft is arranged perpendicularly to the center axes of the suction duct and the exhaust gas recirculation duct, wherein, in a first end position of the control body, the suction duct is at least throttled upstream of a port of the exhaust gas recirculation duct, and wherein the exhaust gas recirculation duct is closed in a second end position. Using only one flap and one actuator, the composition of the air flow and the exhaust gas flow which is supplied to the internal combustion engine is accordingly controlled by always closing the suction duct to the same extent that the exhaust gas recirculation duct is opened, and vice versa.

In an embodiment of the present invention, a first valve seat for the control body can, for example, be formed for closing the suction duct, the seat being formed at the end of an upstream section of the suction duct which has a smaller circumference as a subsequent downstream section of the suction duct. This results in an axial abutment of the control body on the first valve seat, causing a tight closing, and the control body can be turned out of the main flow downstream of the valve seat so that, when the air duct is fully open, the flow resistance by the flap is minimized.

A particularly simple assembly and manufacture of an intake system of such a design is obtained if a suction housing, which forms the upstream section of the suction duct, extends into a mixing housing, which forms the downstream section of the suction duct. The first valve seat can then be formed at the end of the suction housing.

In an embodiment of the present invention, the lateral bulge can, for example, be arranged outside the cross section of the upstream section of the suction duct. The bulge is accordingly in the lee of the suction housing, whereby an entraining of condensate arising is further prevented.

This effect is even increased by arranging the shorter side wall of the intake fitting, which is located upstream with respect to the suction duct, upstream of the first valve seat, and by arranging the longer, downstream side wall of the intake fitting downstream of the first valve seat. An air flow flowing into the inside of the intake fitting is thus virtually excluded. No direct flow of the air flow onto the crankcase breather gas is correspondingly caused, whereby additional formation of condensate is avoided.

In an embodiment of the present invention, a wall of the intake fitting that is a radially inner wall with respect to the suction duct can, for example, be arranged at a radial distance from the first valve seat. Due to this distance, a static air gap is formed between the flowing air flow from the suction housing and the intake fitting, which has an insulating effect, whereby a cooling of the intake fitting is prevented, thereby reducing the formation of condensate once more.

It is also advantageous if the trough-shaped recess of the suction duct is arranged geodetically below the first valve seat so that the control body can be turned entirely out of the area of the main flow from the suction duct. In this second end position, the control body can, for example, be arranged in the trough-shaped recess.

An intake system is thus provided with which both the air mass flow in the suction duct and the exhaust gas mass flow of an exhaust gas recirculation circuit can be controlled and a crankcase breather gas can be supplied without the risk of damage to downstream components, such as a compressor of a turbocharger, caused by a formed condensate. The movable parts, such as flaps and shafts, are also only subjected to a slight additional load, so that their service life is not changed significantly despite the supply of the crankcase breather gases into the suction duct. For this purpose, the formation of condensate is significantly reduced and the condensate still formed is discharged at positions where it is harmless or is again evaporated.

An embodiment of an intake system according to the present invention is illustrated in the drawings and will be described below.

The intake system according to the present invention comprises a housing 10 which delimits a suction duct 12 and at which a port 14 of an exhaust gas recirculation duct 16 is formed. The suction duct 12 extends substantially straight to an axial inlet of a compressor housing of a turbocharger (not shown in the drawings), whereas the exhaust gas recirculation duct 16 opens into the suction duct 12 approximately perpendicularly thereto.

The housing 10 is formed by a first, substantially tubular, suction housing 18 whose downstream end is beveled and includes an angle α of about 80° with a center axis of the suction duct 12. The suction housing 18 extends into a mixing housing 20 via the downstream end and/or is pushed into the mixing housing 20 until it abuts on a flange 22 via which the suction housing 18 is fastened to the mixing housing 20 via screws 24.

The port 14 of the exhaust gas recirculation duct 16 extends geodetically from below into an opening 26 of the mixing housing 20 and is formed as a separate housing part. The mixing housing 20 forms an extension of the suction duct 12 which in turn opens, for example, into the axial inlet of the compressor housing. In the mixing housing 20, a shaft 28 is supported for rotation about a rotary axis 30 which can be actuated by an actuator 32. The rotary axis 30 of the shaft 28 is arranged perpendicular to the center axes of the suction duct 12 and the exhaust gas recirculation duct 16 and is situated between the port 14 of the exhaust gas recirculation duct 16 at the upstream end of the exhaust gas recirculation duct 16, with respect to the air flow, and the axial end of the suction housing 18 on the side thereof facing the exhaust gas recirculation duct 16. The flow cross section of the suction housing 18 is smaller than that of the mixing housing 20, wherein the suction housing 18 is fastened to the mixing housing 20 and extends therein so that a trough-shaped recess 34, formed downstream of the port 14 of the exhaust gas recirculation duct 16, is arranged in the static flow zone of the air flow from the suction housing 18 in which the shaft 28 penetrates the mixing housing 20.

A control body 36 is fastened on the shaft 28 which is eccentrically arranged in the suction duct 12, the control body being formed by a flap 38 as well as a closing member 42 fastened to the first flap 38 by a coupling member 40. The flap 38 extends from the shaft 28 into the interior of the mixing housing 20 and controls the flow cross section of the suction housing 12. For this purpose, in a first end position, the flap 38 rests against the axial end of the suction housing 18 by its first surface 44, which end serves as the first valve seat 46.

The flap 38 has a bore formed therein in which the coupling member 40 is fastened to the flap 38. The coupling member 40 extends perpendicularly from a second surface 48 of the flap 38 opposite the first surface 44 and penetrates the closing member 42 with its opposite end, which is in turn fastened to this end of the coupling member 40. The fastening of the closing member 42 has the effect that, when the shaft 28 is turned into a second end position in which the closing member 42 rests on a second valve seat 50 formed at the end of the port 14 of the exhaust gas recirculation duct 16, a closing of the exhaust gas recirculation duct 16 is effected.

Figure 1:
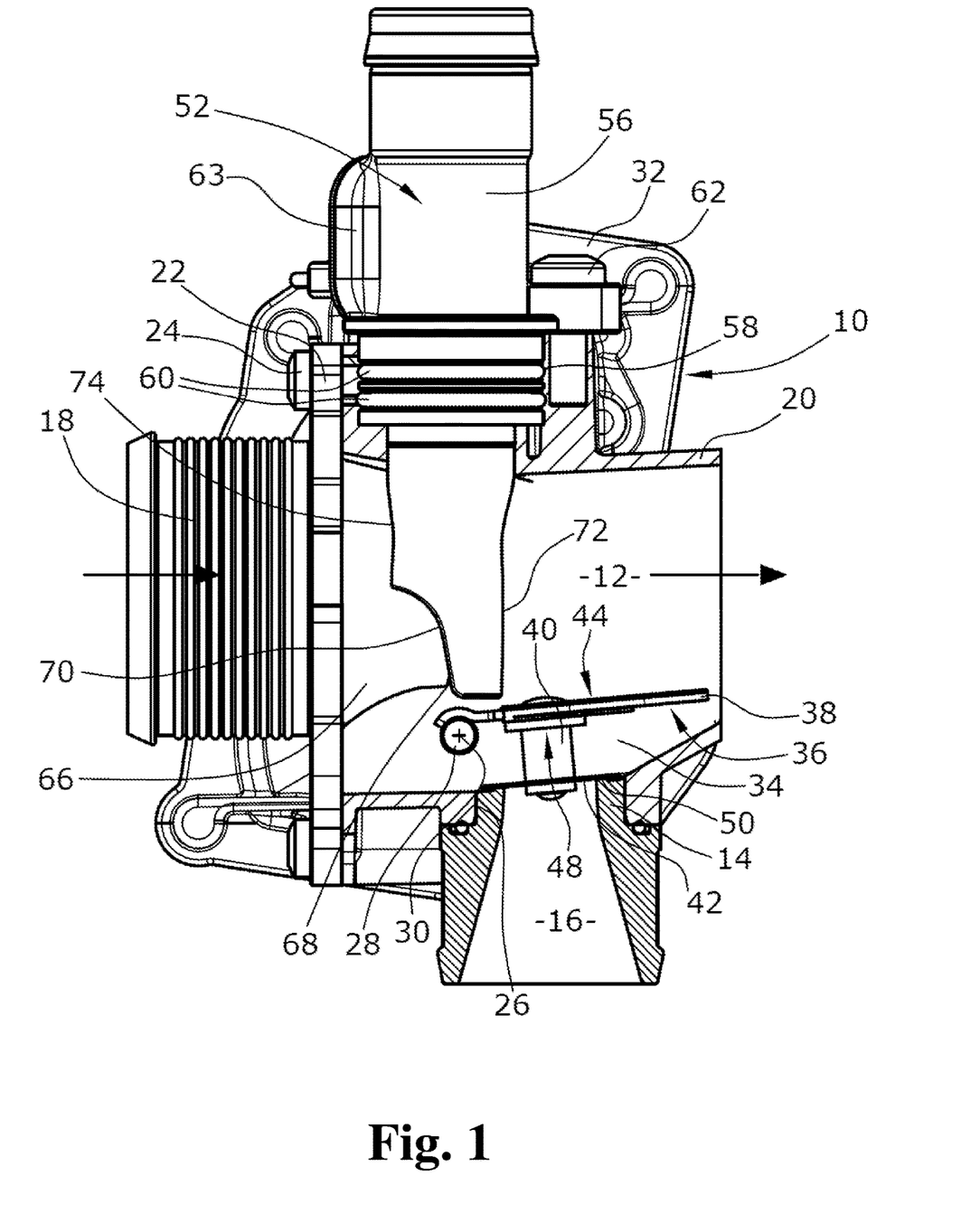
FIG. 1 is a side view of an intake system according to the present invention shown in section.
Figure 2:
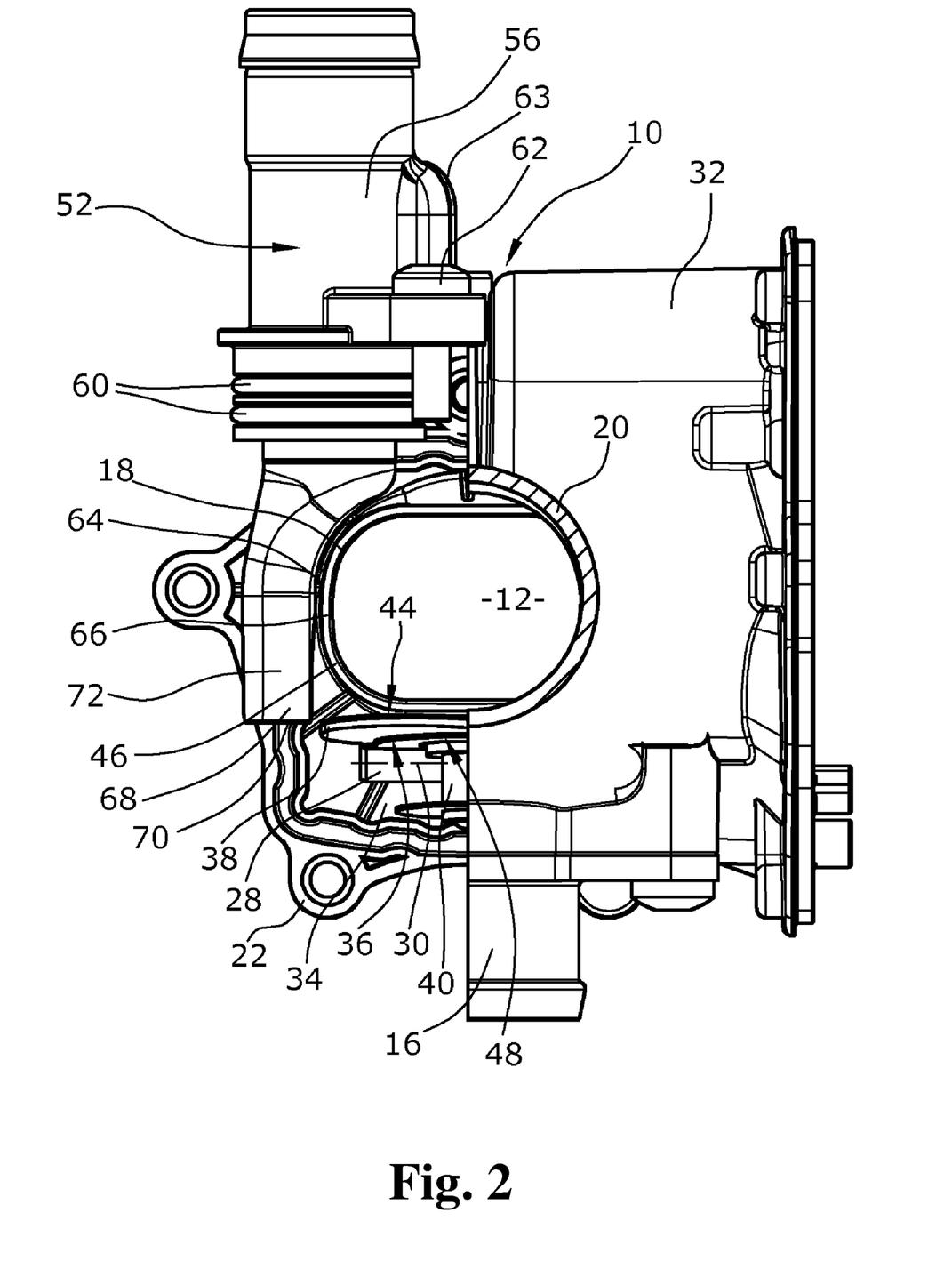
FIG. 2 is a front view of the intake system according to the present invention in FIG. 1 with the mixing housing cut away in the left half.
Figure 3:
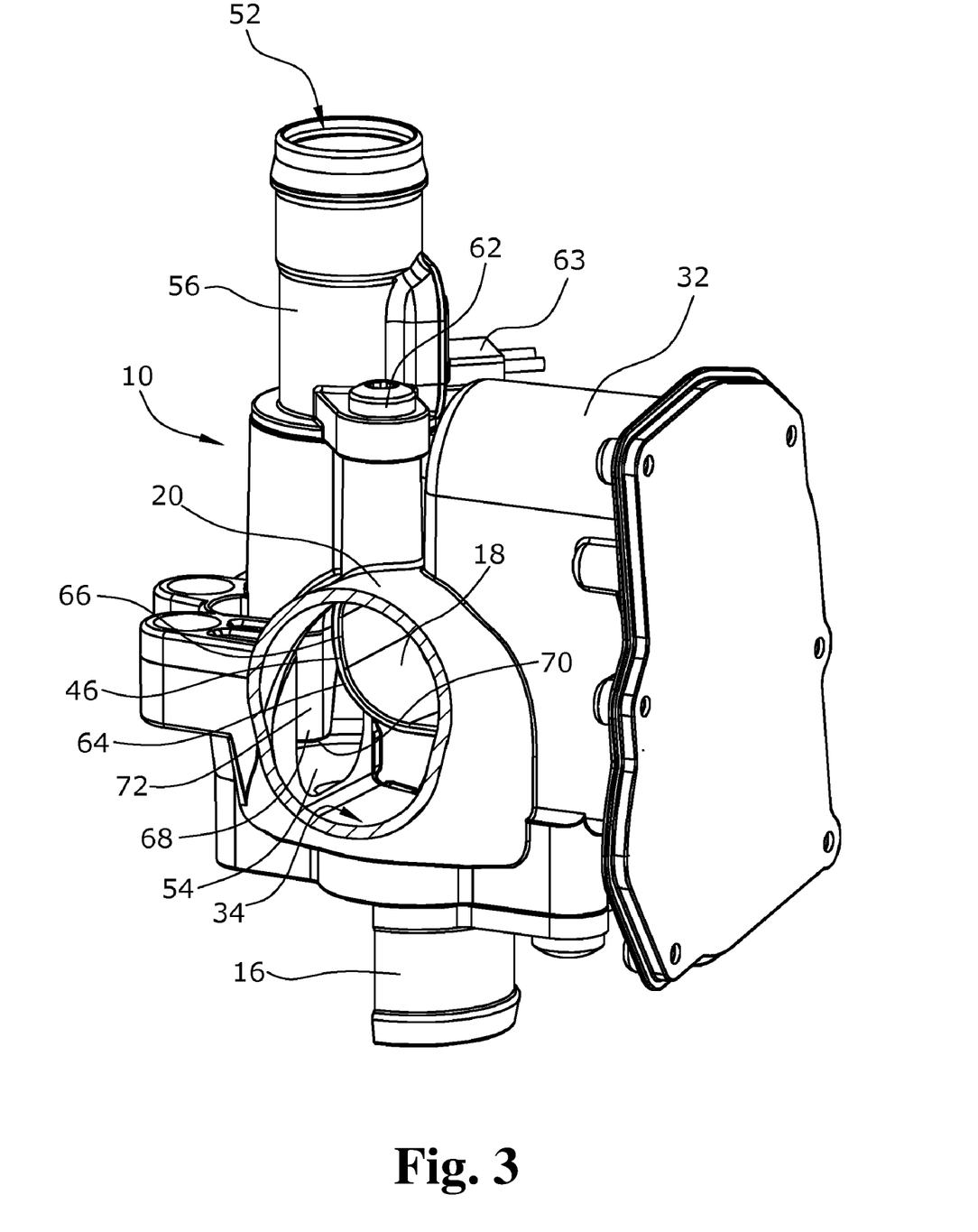
FIG. 3 is a perspective view on the intake system according to the present invention illustrated in FIGS. 1 and 2.
Figure 4:
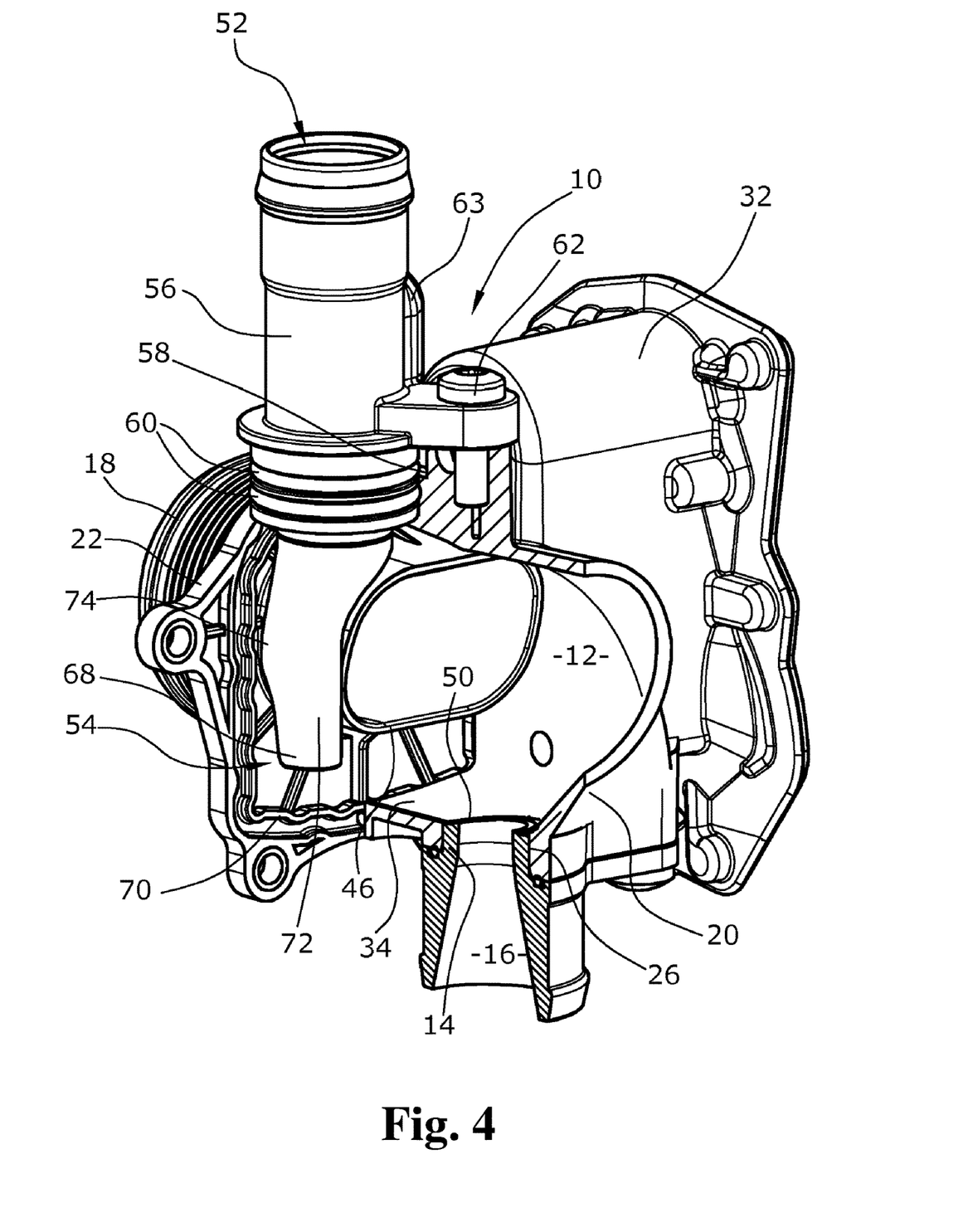
FIG. 4 is another perspective view on the intake system according to the present invention illustrated in FIGS. 1 to 3 with the mixing housing cut away in the left half.

According to the present invention, a crankcase breather duct 52 also extends into the suction duct 12, namely from above into a lateral bulge 54 of the suction duct 12, which has a common cross section with the trough-shaped recess 34 and the port 14 of the exhaust gas recirculation duct 16, the cross section being arranged perpendicular to the center axis of the suction duct 12 or, in other words, the lateral bulge 54 is situated in the same run length section of the suction duct 12 as the trough-shaped recess 34, the control body 36 and the port 14 of the exhaust gas recirculation duct 16. The crankcase breather duct 52 is at least partly formed in a tubular intake fitting 56 plugged through a corresponding opening 58 of the mixing housing 20 with interposition of two O-rings 60 and is then fastened to the mixing housing 20 via a screw 62. A PTC heater element 63 is arranged at the intake fitting 56 above this fastening. A wall 64 of the intake fitting 56, which is a radially inner wall with respect to the suction duct 12, is formed (see FIG. 2) so that the wall 64, seen in plan view on the end of the suction housing 18, is arranged entirely outside of the flow cross section thereof and, for the greater part, is at a uniform distance from the radially delimiting wall 66 of the suction duct section in the suction housing 18. A port 68 of the crankcase breather duct 52 is directed downward and extends into the geodetically lower region of the lateral bulge 54 which transitions into the trough-shaped recess 34 in this region. An end 70 of the intake fitting 56 has a three-dimensional shape, wherein a downstream side wall 72 of the intake fitting 56 is formed to be longer than a shorter, upstream side wall 74, as can in particular be seen in FIG. 1. The end 70 of the intake fitting 56 has an arcuate shape connecting the two side walls 72, 74. The longer side wall 72 extends geodetically to below the lower edge of the first valve seat 46 and is arranged downstream of the lower edge of the first valve seat 46, whereas the shorter upstream side wall 74 is arranged upstream of the first valve seat 46 and ends above the lower edge of the first valve seat 46.

If, during operation, crankcase breather gas which includes oil mist, condensates and water vapor, gets into the intake system via the intake fitting 56, no immediate contact with the possibly cold air flow occurs since the introduction of both the liquid condensate and the gas is effected entirely in the lee of the suction housing 18. The gas is accordingly not swirled in the air flow and suddenly cooled due to contact with the air flow so that no additional formation of condensate occurs. The gas is also not directly entrained from the intake fitting 56 towards the compressor. Existing condensate instead drops from the end 70 of the intake fitting 56 into the lateral bulge 54 and, under the effect of gravity, flows from there into the trough-shaped recess 34 and thus directly to the second valve seat 50. As soon as the second valve seat 50 is opened, the condensate drops into the geodetically lower exhaust gas recirculation duct 16, where the condensate either is evaporated again by the heat of the exhaust gas flow and is thus directed in a vaporous state into the air flow together with the warm exhaust gas flow, or flows through the exhaust gas recirculation duct to the exhaust gas outlet via the parts of the exhaust gas system downstream of the particulate filter. The introduction of the crankcase breather gas occurs due to the pressure gradient between the crankcase and the compressor. The gas reaching the bulge is gradually and slowly introduced into the airflow due to the natural movement of the gas so that the air flow is usually not saturated with respect to the humidity present therein and can absorb these small amounts of water vapor without the water condensing therefrom.

An intake system is thus provided with which both the air mass flow in the suction duct and the exhaust gas mass flow of an exhaust gas recirculation circuit can be controlled and a crankcase breather gas can be supplied, while damage to downstream components, such as a compressor of a turbocharger, caused by a formed condensate is reduced, since the condensate is evaporated or discharged at least in part and the formation of new condensate is also largely reduced. The movable parts, such as flaps and shafts, are also loaded only little since they are not directly subjected to the oil mists and the water. Existing noise emission is also reduced since the crankcase breather gas does not flow directly into the air flow which could otherwise cause flow noise due to turbulence.

It should be clear that the scope of protection of the present application is not restricted to the described embodiment. Various structural versions are conceivable for the introduction of the crankcase gas. The crankcase gas may also be supplied in a region where no exhaust gas recirculation valve is arranged, but the exhaust gas recirculation duct is freely accessible. It is also possible to form and operate an exhaust gas valve separately from the throttle flap. Various structural versions of the design and the positioning of the crankcase breather duct are also conceivable, wherein it is of particular importance to arrange the crankcase breather duct in low-turbulence flow regions and to prevent a direct flow. Reference should also be had to the appended claims.

What is claimed is:

1. An intake system for an internal combustion engine, the intake system comprising:
    a suction duct comprising a lateral bulge;
    an exhaust gas recirculation duct comprising a port into the suction duct;
    a crankcase breather duct configured to extend into the lateral bulge in the suction duct;
    a control body; and
    a first valve seat for the control body arranged at an end of an upstream section of the suction duct for closing the suction duct,
    wherein,
    the crankcase breather duct comprises a port,
    the port of the crankcase breather duct is formed as an intake fitting which extends into the lateral bulge,
    the intake fitting comprises a wall,
    the wall is a radially inner wall with respect to the suction duct, and
    the wall is arranged at a radial distance from the first valve seat.

2. The intake system as recited in claim 1, wherein,
    the suction duct comprises a center axis, and
    the port of the exhaust gas recirculation duct and the port of the crankcase breather duct have a common cross section which is perpendicular to the center axis of the suction duct.

3. The intake system as recited in claim 2, wherein the port of the crankcase breather duct is arranged geodetically above the port of the exhaust gas recirculation duct.

4. The intake system as recited in claim 2, wherein,
    the suction duct further comprises a recess, and
    the port of the exhaust gas recirculation duct is arranged at a geodetically lower end of the recess.

5. The intake system as recited in claim 4, wherein the lateral bulge is configured to transition into the recess.

6. The intake system as recited in claim 4, wherein,
    the exhaust gas recirculation duct further comprises a center axis, and
    further comprising, as seen in a flow direction of the suction duct:
        a shaft configured to act as a rotary axis arranged upstream of the port of the exhaust gas recirculation duct and perpendicular to the center axis of the suction duct and to the center axis of the exhaust gas recirculation duct,
    wherein,
    the control body is eccentrically supported on the shaft to have a first end position and a second end position,
    in the first end position of the control body, the suction duct is at least throttled upstream of the port of the exhaust gas recirculation duct and,
    in the second end position of the control body, the exhaust gas recirculation duct is closed.

7. The intake system as recited in claim 6, wherein, the control body, in the second end position, is arranged in the recess.

8. The intake system as recited in claim 6, wherein,
    the upstream section of the suction duct comprises a smaller circumference, and
    the suction duct further comprises a downstream section which is arranged to follow the upstream section.

9. The intake system as recited in claim 8, wherein the trough shaped recess of the suction duct is arranged geodetically below the first valve seat.

10. The intake system as recited in claim 8, wherein,
    the upstream section of the suction duct is formed by a suction housing,
    the downstream section of the suction duct is formed by a mixing housing, and
    the suction housing is arranged to extend into the mixing housing.

11. The intake system as recited in claim 10, wherein the lateral bulge is arranged outside the upstream section of the suction duct.

12. The intake system as recited in claim 1, wherein the intake fitting comprises an end which is beveled so that the end comprises a longer side wall and a shorter side wall which are opposite to each other, the longer side wall being arranged downstream with respect to the suction duct.

13. The intake system as recited in claim 12, wherein,
    the shorter side wall of the intake fitting is an upstream side wall with respect to the suction duct and is arranged upstream of the first valve seat, and
    the longer side wall of the intake fitting is arranged downstream of the first valve seat.

14. The intake system as recited in claim 1, further comprising:
   a heating element arranged at the crankcase breather duct.

\* \* \* \* \*